US012593859B2

(12) United States Patent
Snyder et al.

(10) Patent No.: US 12,593,859 B2
(45) Date of Patent: Apr. 7, 2026

(54) HIGH LOAD FLAVOR PARTICLES

(71) Applicant: Firmenich SA, Geneva (CH)

(72) Inventors: Donald Snyder, Plainsboro, NJ (US);
Jian Zhang, Plainsboro, NJ (US)

(73) Assignee: FIRMENICH SA, Satigny (CH)

( * ) Notice: Subject to any disclaimer, the term of this
patent is extended or adjusted under 35
U.S.C. 154(b) by 162 days.

(21) Appl. No.: 16/302,259

(22) PCT Filed: May 24, 2017

(86) PCT No.: PCT/EP2017/062690
§ 371 (c)(1),
(2) Date: Nov. 16, 2018

(87) PCT Pub. No.: WO2017/203006
PCT Pub. Date: Nov. 30, 2017

(65) Prior Publication Data
US 2019/0289891 A1     Sep. 26, 2019

Related U.S. Application Data

(60) Provisional application No. 62/342,617, filed on May
27, 2016.

(51) Int. Cl.
*A23P 30/25*        (2016.01)
*A23L 27/00*        (2016.01)
(Continued)

(52) U.S. Cl.
CPC ............. *A23L 27/72* (2016.08); *A23L 29/212*
(2016.08); *A23L 29/219* (2016.08); *A23L*
*29/35* (2016.08);
(Continued)

(58) Field of Classification Search
CPC .......... A23P 30/25; A23P 10/30; A23P 30/20;
A23L 27/72; A23L 29/35; A23L 29/212;
A23L 29/219
See application file for complete search history.

(56) References Cited

U.S. PATENT DOCUMENTS 748,850 A       1/1904  Duncan
2005/0266134 A1*  12/2005  Nagao ...................... A23F 3/40
426/534

(Continued)

FOREIGN PATENT DOCUMENTS

WO       1985003414 A1    8/1985
WO       2000025606 A1    5/2000
WO       2014128071 A1    8/2014

OTHER PUBLICATIONS

"Granular" Definition from Merriam-Webster Dictionary. Retrieved
Jan. 7, 2022. https://www.merriam-webster.com/dictionary/granular
(Year: 2022).*

(Continued)

*Primary Examiner* — Katherine D LeBlanc
(74) *Attorney, Agent, or Firm* — Armstrong Teasdale LLP

(57)        ABSTRACT

Provided herein is a method for making an extruded particle
comprising:
a. mixing a modified starch and ≤20% water wherein the
water content is such that said mixture has a glass
transition temperature $T_g$ above room temperature;
b. heating the mixture at a temperature sufficient to form a
molten mass;
c. adding ≥12% flavor to the mixture or to the molten mass
or both to form a flavored molten mass;
d. extruding the melt through a die to form an extrudate; and
e. cutting or crushing the extrudate to form an extruded
particle having a retained flavor of about ≥12% by weight (Continued)

Figure 1:
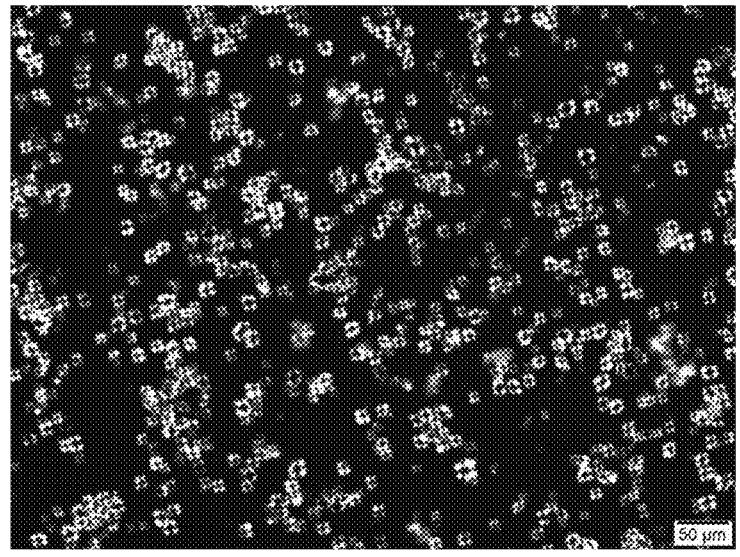

based on the total weight of the particle wherein the glass transition temperature of the particle is substantially the same as the mixture.

Also provided herein is a a particle comprising: a) a carrier wherein the carrier comprises: i) a modified starch; and ii) a maltodextrin or blend of maltodextrins with different DE values; b) ≤20% by weight, water of the total weight of the particle; and c) ≥12% flavor; wherein the particle has a size from about 0.5 to about 5 mm.

9 Claims, 10 Drawing Sheets

(51) Int. Cl.

| | | |
|---|---|---|
| *A23L 29/212* | (2016.01) | |
| *A23L 29/219* | (2016.01) | |
| *A23L 29/30* | (2016.01) | |
| *A23P 10/30* | (2016.01) | |
| *A23P 30/20* | (2016.01) | |

(52) U.S. Cl.
CPC ............... *A23P 10/30* (2016.08); *A23P 30/20* (2016.08); *A23P 30/25* (2016.08); *A23V 2002/00* (2013.01)

(56) References Cited

U.S. PATENT DOCUMENTS

| | | | |
|---|---|---|---|
| 2009/0047434 A1 | 2/2009 | Trophardy | |
| 2010/0266743 A1* | 10/2010 | Chen ...................... | A23L 7/109 |
| | | | 426/549 |
| 2010/0330369 A1* | 12/2010 | Veelaert ............... | A61K 8/0254 |
| | | | 428/403 |
| 2013/0243851 A1 | 9/2013 | Zasypkin et al. | |
| 2016/0058047 A1 | 3/2016 | Zasypkin | |

OTHER PUBLICATIONS

International Search Report and Written Opinion, application PCT/EP2017/062690, mailed Aug. 31, 2017.

* cited by examiner

HIGH LOAD FLAVOR PARTICLES

CROSS-REFERENCE

This application is a 371 filing of International Patent Application PCT/EP2017/062690 filed 24 May 2017, which claims the benefit of U.S. provisional patent application 62/342,617, filed 27 May 2016, the contents of which are hereby incorporated by reference in their entirety.

FIELD

The field is related to encapsulated flavor particles that have a high flavor load.

BACKGROUND

A limitation of melt extrusion is low flavor load which is typically less than 10% by weight. It has been reported that a flavor load can be as low as 1-2% for very volatile flavors and up to 10% with less volatile flavors with carriers based on food biopolymers. Melt extrusion with carbohydrate polymers typically has a maximum flavor load of about 5-6% by weight. In many applications, high flavor intensity is required and such a low flavor load is not cost effective in use. Hence it is desirable to have a high flavor load in an extruded particle.

SUMMARY

Provided herein is a method for making an extruded particle comprising
a. mixing a modified starch and ≤20% water wherein the water content is such that said mixture has a glass transition temperature $T_g$ above room temperature;
b. heating the mixture at a temperature sufficient to form a molten mass.
c. adding a flavor ≥ in an amount of about 12% by weight of the mixture or molten mass or both to form a flavored molten mass;
d. extruding the melt through a die to form an extrudate;
e. cutting or crushing the extrudate to form an extruded particle having a retained flavor of about ≥12% by weight based on the total weight of the particle wherein the glass transition temperature of the particle is substantially the same as the mixture.
Also provided is a particle comprising:
a. a carrier wherein the carrier comprises:
  i. a modified starch;
  ii. a maltodextrin or blend of maltodextrins with different dextrose equivalent (DE) values
b. ≤20% by weight water of the total weight of the particle;
c. ≥12% flavor, wherein the particle has a size from about 0.5 to about 5 mm.

DETAILED DESCRIPTION OF THE DRAWINGS

FIG. 1. Shows a microphotograph of Capsul® under polarized light.

Figure 2:
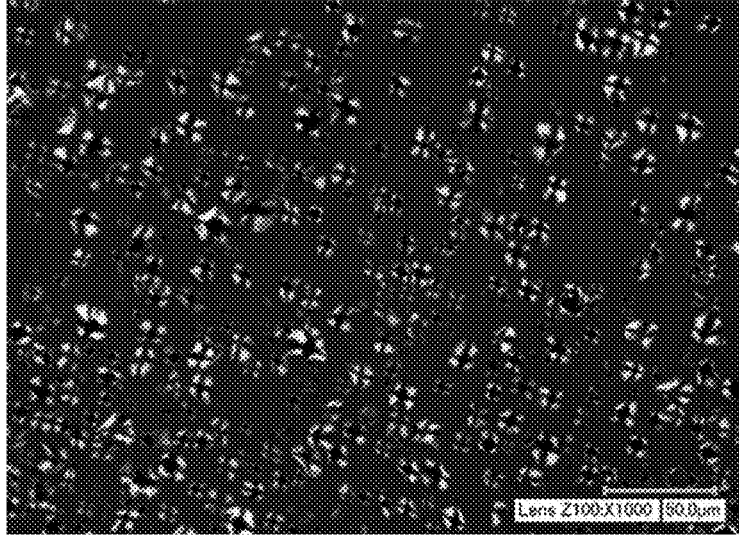

FIG. 2. Shows a microphotograph of MiraCap® under polarized light.

Figure 3:
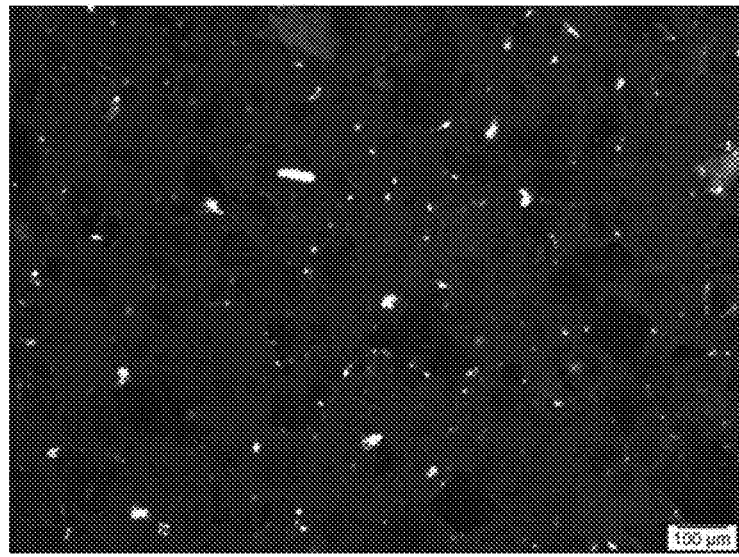

FIG. 3. Shows a polarized light microphotograph of extruded particles with a carrier containing 100% 18 DE maltodextrin.

Figure 4:
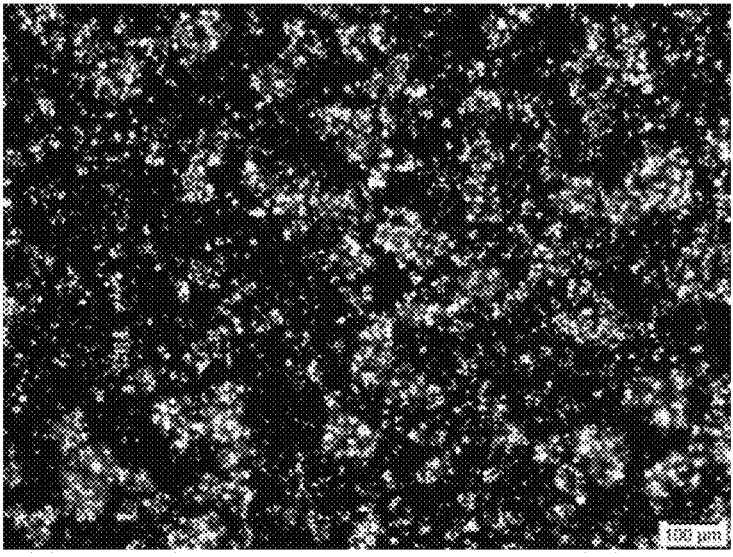

FIG. 4. Shows a polarized light microphotograph of extruded particles with a carrier containing 70% 18 DE and 30% Capsul®.

Figure 5:
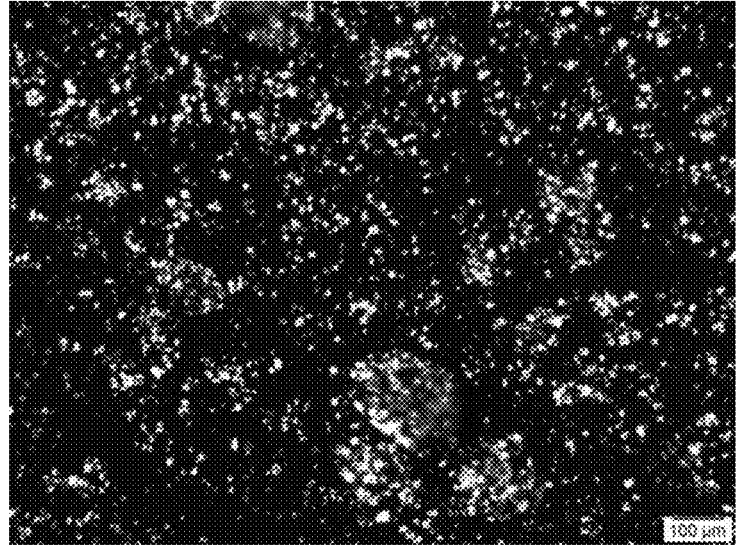

FIG. 5. Shows a polarized light microphotograph of extruded particles with a carrier containing 70% 10 DE and 30% Capsul®.

Figure 6:
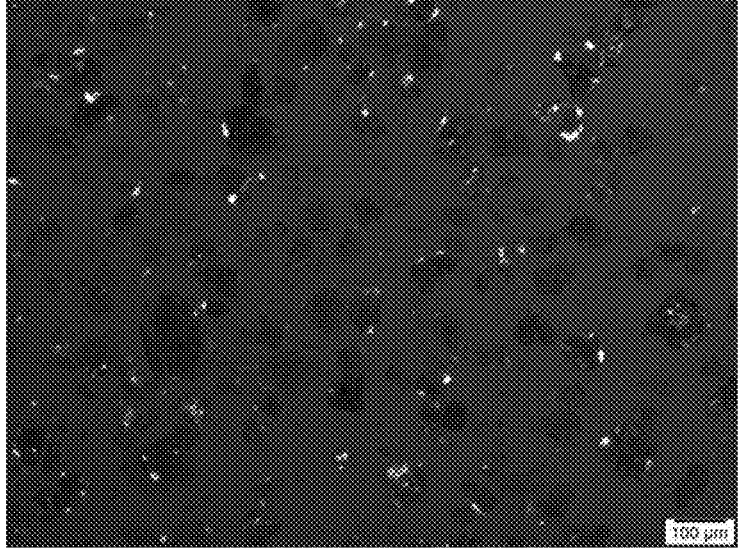

FIG. 6. Shows a polarized light microphotograph of extruded particles with a carrier containing 70% 6 DE and 30% Capsul®.

Figure 7:
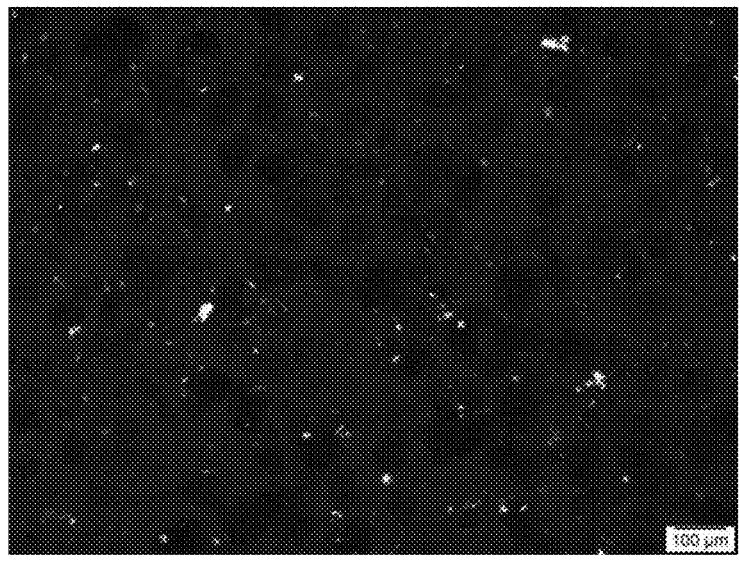

FIG. 7. Shows a polarized light microphotograph of extruded particles with a carrier containing 70% 1 DE and 30% Capsul®.

Figure 8:
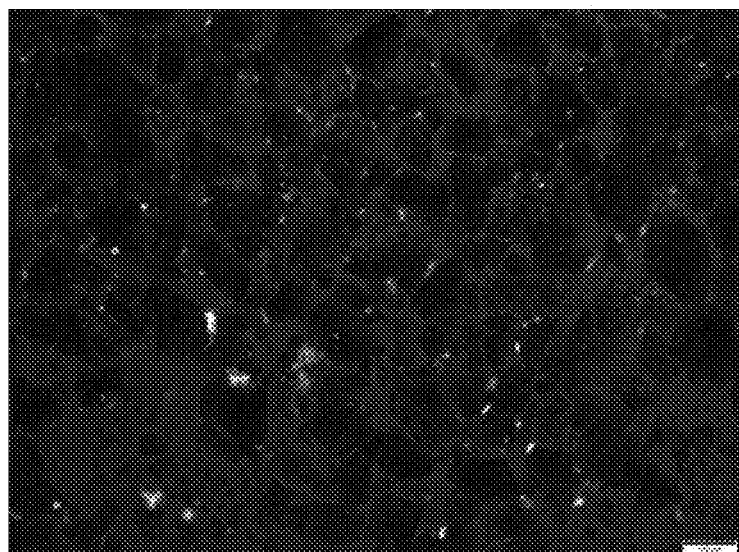

FIG. 8. Shows a polarized light microphotograph of extruded particles with a carrier containing 35% 1 DE, 35% 6 DE, and 30% Capsul®.

Figure 9:
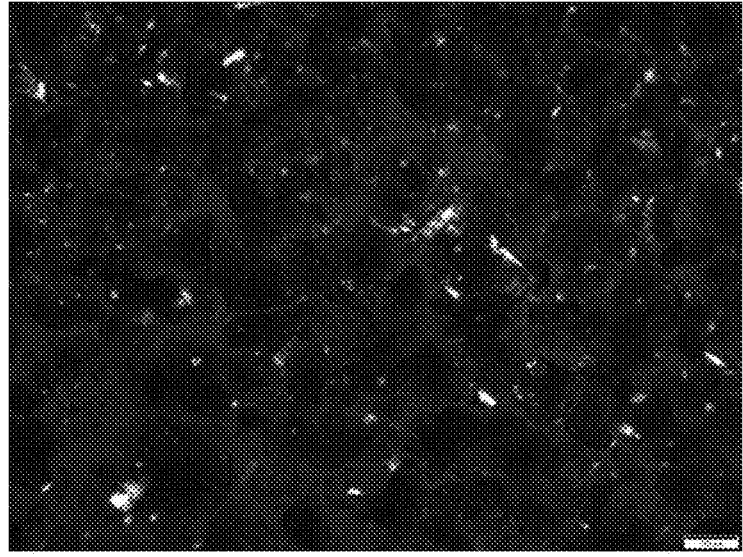

FIG. 9. Shows a polarized light microphotograph of extruded particles with a carrier containing 35% 1 DE, 35% 18 DE, and 30% Capsul®.

Figure 10:
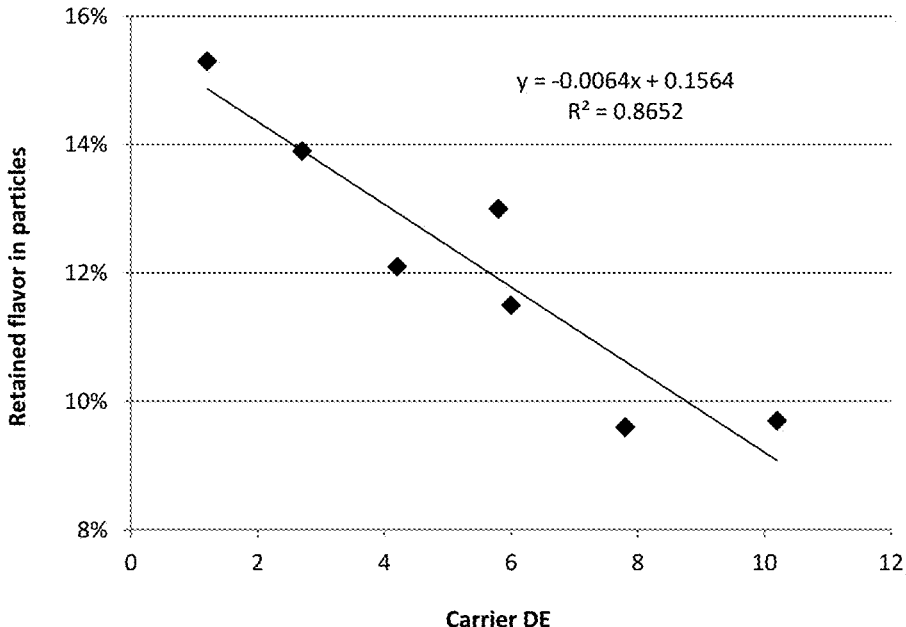

FIG. 10. Shows the relationship between maximum flavor retained in extruded particles and the carrier DE value.

Figure 11:
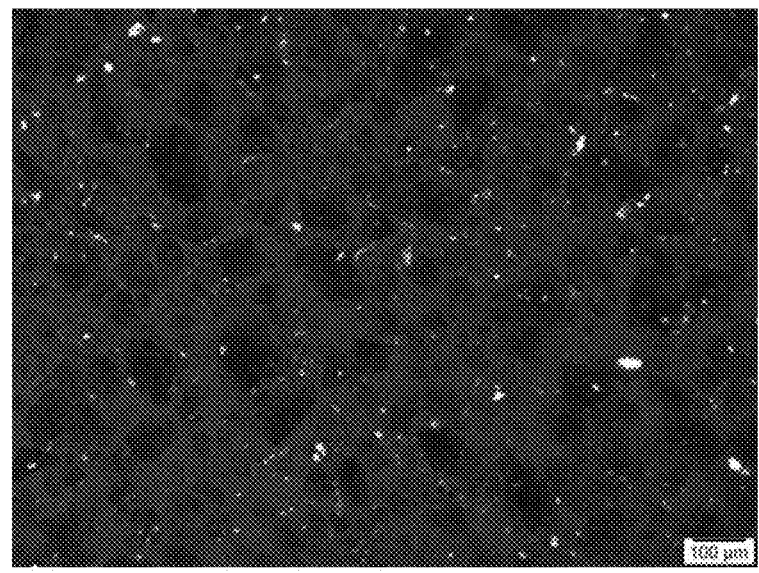

FIG. 11. Shows a polarized light microphotograph of extruded particles with a carrier containing 70% 18 DE and 30% pre-gelatinized Capsul®.

Figure 12:
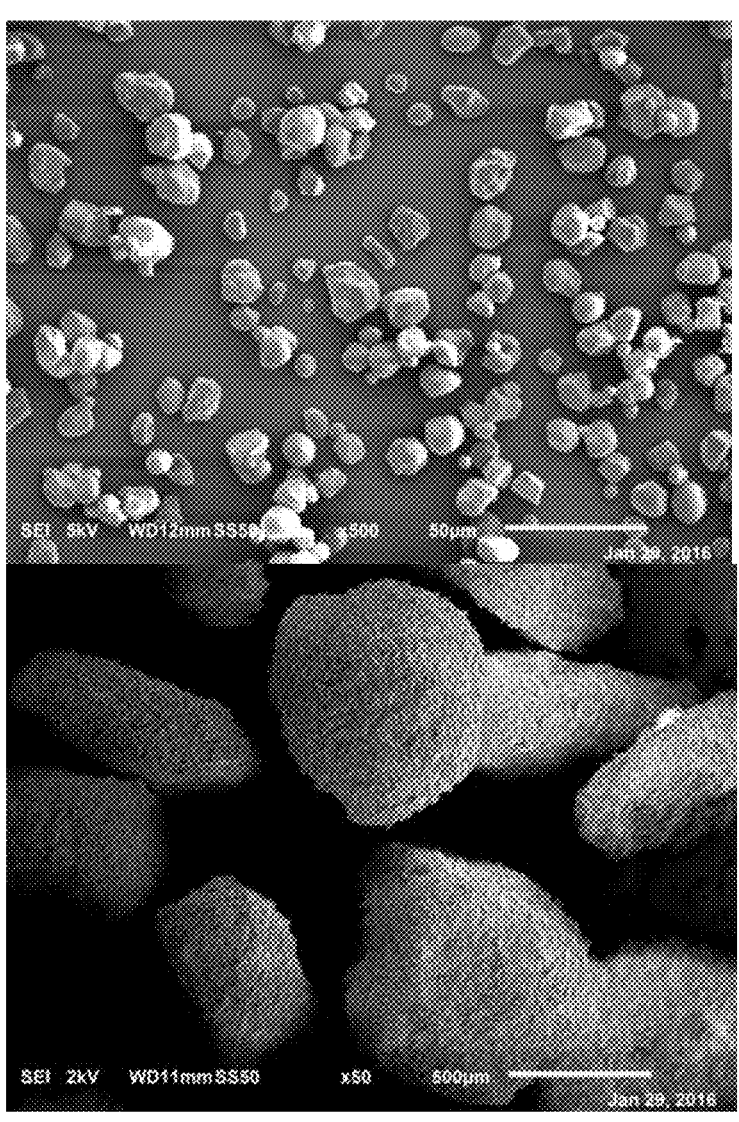

FIG. 12. Shows a scanning electron microscopy of Capsul® (top) and compressed Capsul® (bottom) used in examples of H and I.

Figure 13:
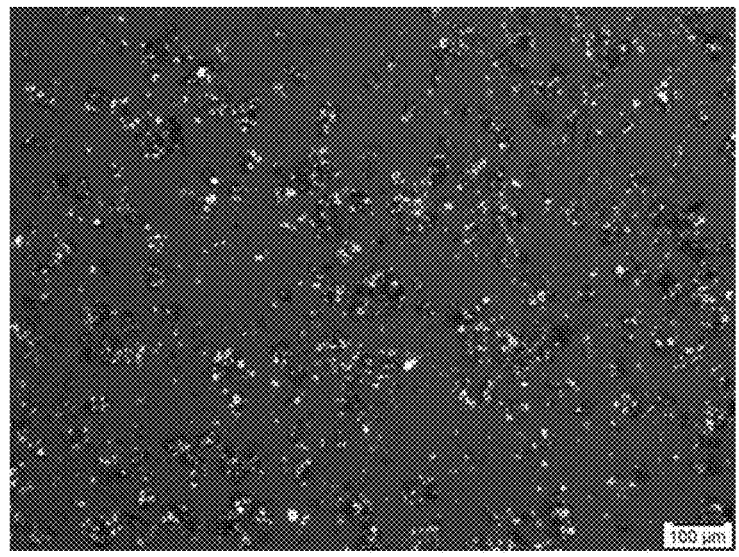

FIG. 13. Shows a polarized light microphotograph of extruded particles with a carrier containing 50% 18 DE and 50% Capsul®.

Figure 14:
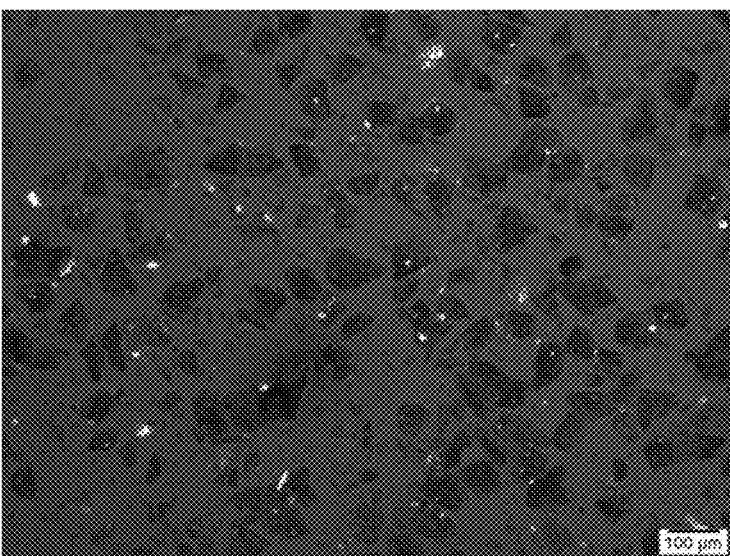

FIG. 14. Shows a polarized light microphotograph of extruded particles with a carrier containing 50% 18 DE and 50% compressed Capsul®.

Figure 15:
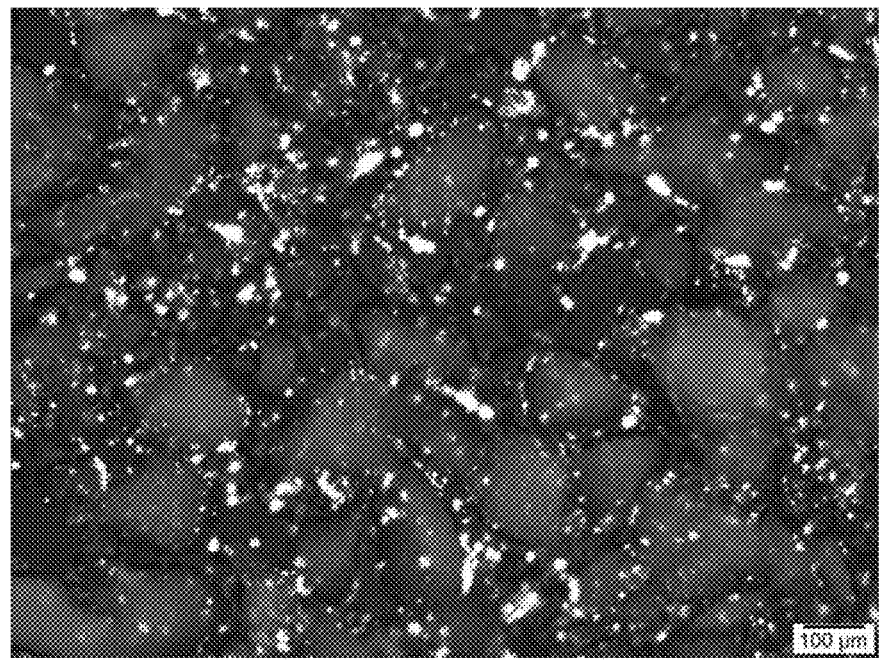

FIG. 15. Shows a polarized light microphotograph of extruded particles with a carrier containing 50% 6 DE and 50% Capsul® using a screw configuration before optimization.

Figure 16:
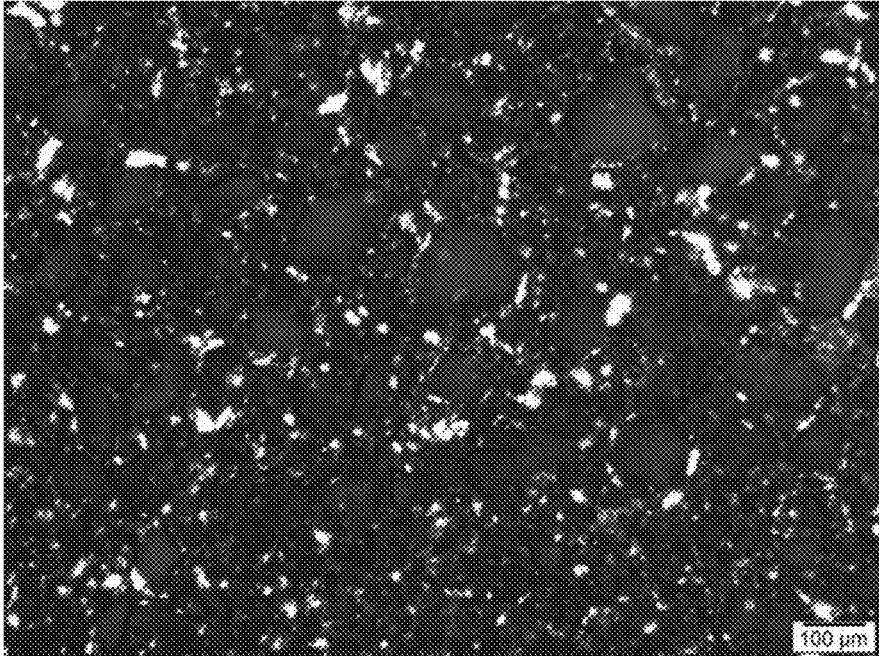

FIG. 16. Shows a polarized light microphotograph of extruded particles with a carrier containing 50% 6 DE and 50% Capsul® using an optimized screw configuration.

Figure 17:
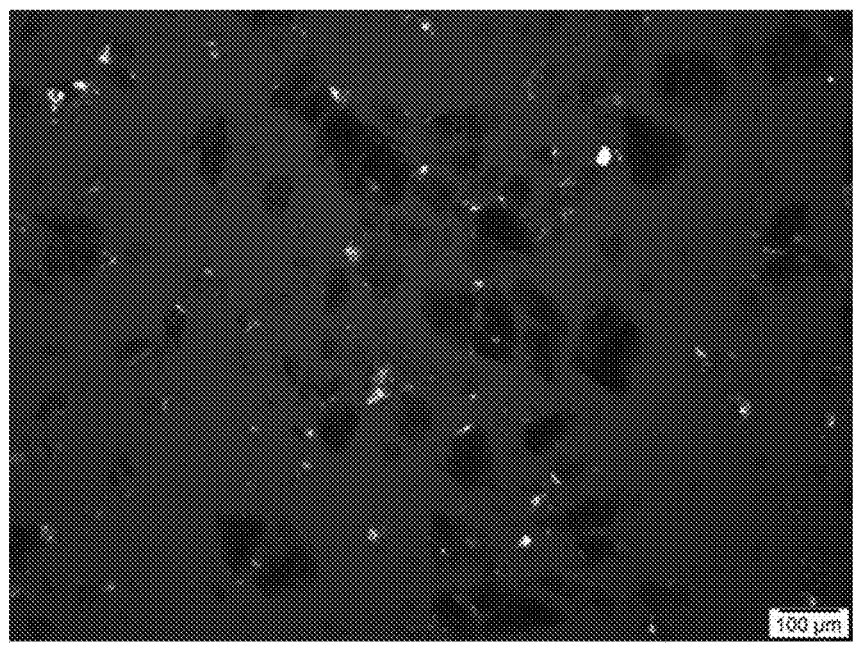

FIG. 17. Shows a polarized light microphotograph of extruded particles with a carrier containing 56% 6 DE, 9% glucose monohydrate and 35% Capsul® using an optimized screw configuration.

Figure 18:
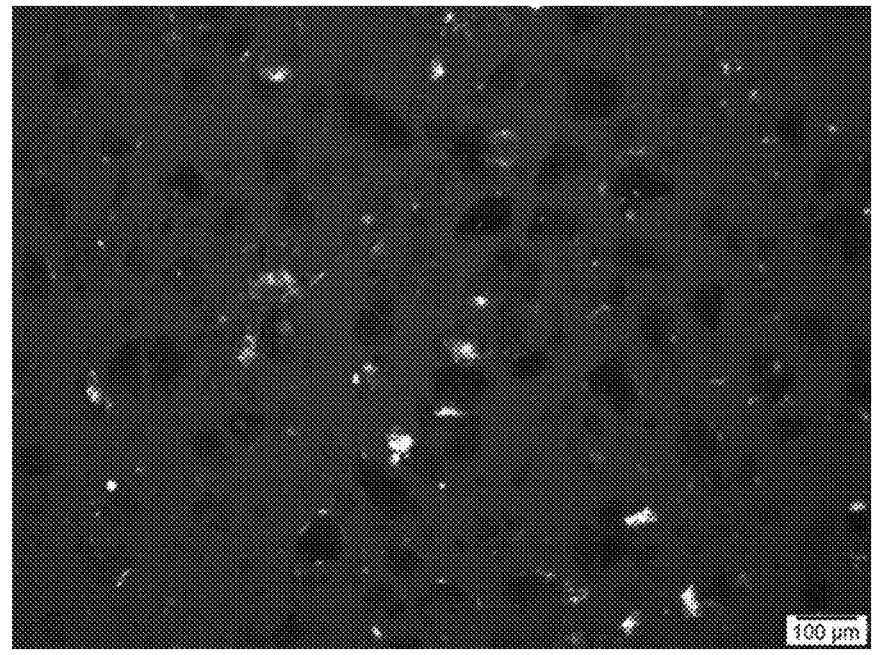

FIG. 18. Shows a polarized light microphotograph of extruded particles with a carrier containing 41% 6 DE, 9% glucose monohydrate and 50% Capsul® using an optimized screw configuration.

DETAILED DESCRIPTION

For the Summary, Description and Claims, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of".

By modified starch herein is meant a starch that has been modified to increase its hydrophobicity to act as stabilizer and emulsifier. Some non-limited examples include octenylsuccinic anhydride-modified starches such as MiraCap® by Tate & Lyle, Capsul® by Ingredion, EmCap® by Cargill, etc.

Also provided herein is a method for making an extruded particle comprising a. mixing a modified starch and ≤20% water wherein the water content is such that said mixture has a glass transition temperature $T_g$ above room temperature;

b. heating the mixture at a temperature sufficient to form a molten mass that does not show substantial birefringence under polarized light; when referring to birefringence throughout all embodiments, it meant the characteristic birefringence of starches.

c. adding a flavor ≥ in an amount of about 12% by weight of the mixture or molten mass or both to form a flavored molten mass;

d. extruding the melt through a die to form an extrudate;

e. cutting or crushing the extrudate to form an extruded particle having a retained flavor of about ≥12% by weight based on the total weight of the particle wherein the glass transition temperature of the particle is substantially the same as the mixture.

Further provided is a particle comprising:

a. a carrier wherein the carrier comprises:

i. a modified starch;

ii. a maltodextrin or blend of maltodextrins with different DE values b. ≤20% by weight water of the total weight of the particle;

c. ≥12% flavor, wherein the particle does not show substantial birefringence under polarized light and has a size from about 0.5 to about 5 mm.

In one embodiment, the carrier comprises a maltodextrin for example but not limited to 1 to 20 DE maltodextrin. Particularly the maltodextrin is a high molecular weight maltodextrin, particularly about 4 to 9 DE, even more particularly 5 to 7 DE and more particularly 6 DE. In one embodiment, the maltodextrin is a low molecular weight maltodextrin particularly about 6 to 20 DE, more particularly 10 to 20, even more particularly 17 to 20, and even more particularly 18 DE. We have found a significant reduction or elimination of birefringence using low molecular weight maltodextrin when using a modified starch that has been agglomerated. While not wishing to be bound to any theory, we believe that the high load of a flavor is the result of the agglomeration of the starch which results in greater gelatinization of the starch which further results in a low level, or complete absence of observed birefringence under polarized light microscopy, which allows the flavor molecule to occupy space that crystalline regions occupied prior to gelatinization. Secondly, the hydrophobic groups of the modified starch have a greater exposure to the hydrophobic flavor.

In one embodiment, maltodextrin is provided in an amount of about 30% up to about 90% by weight, of the total weight of the starch and maltodextrin. The starch and the maltodextrin are considered as the "carrier." In one embodiment, the maltodextrin is provided in an amount of about 30% up to about 70%, more particularly from about 35% to about 65%, by weigh of the total weight of the carrier. In one embodiment the maltodextrin is provided in amount of about 35%, by weight, of the total weight of the carrier. In another embodiment, the maltodextrin is provided in an amount of about 65% of the total weight of the carrier.

In one embodiment the carrier is heated to temperature of about 60° C. up to about 120° C., more particularly from about 90° C. up to about 110° C., more particularly at about 100° C. to 110° C., to form a molten mass.

The extruded particles may be formed at the die face of the extruder while still hot using for example cutting process.

In one embodiment the extruded particles have a size of about 0.5 to 5 mm

In one embodiment the molten mass or particle has very low to no birefringence as observed under polarized light microscopy.

In one embodiment the glass transition temperature of the particle is substantially the same as the glass transition temperature of the mixture. This is attained by ensuring low- or no-loss of water.

According to this particular embodiment, a small amount of water is added to the mixture to guarantee that the glass transition temperature ($T_g$) of the resulting melt corresponds to and is substantially the same as that of the desired $T_g$ value of the final product. In other words, contrary to other methods such as wet-granulation, the glass transition temperature of the mixture before extrusion has already the value required for the final product, which temperature is above room temperature and preferably above 40° C. so that the product can be stored at ambient temperature in the form of free-flowing granules. As a consequence, this embodiment of the invention can dispense with the additional drying step following the extrusion, intended to remove water in order to increase $T_g$ to an acceptable value.

The mixture is thus extruded in an extruder assembly which maintains the temperature of the mixture at a predetermined temperature which is comprised between 90 and 130° C. This temperature is adapted to the system of the invention: first of all, it has to be above the glass transition temperature of the carbohydrate matrix in order to keep the mixture in the form of a molten mass. Pressure is also applied and adjusted to a value appropriate to maintain homogeneity of the melt. Typically, pressure values of up to 100 bar ($10^7$ Pa) can be used depending on the size of the equipments (for example one may need to increase the pressure to 200 bar for larger scale extruders).

In this particular embodiment, as the mixture comes to the die part of the extruder, the temperature is still above the glass transition temperature of the carrier. The extruder is equipped with a cutter-knife and the mixture is thus cut at the temperature of the melt. Once cooled to ambient temperature by the surrounding air, the already cut glassy material does not need to be shaped or dried in a spheroniser, fluid-bed dryer or other device, unlike what is the case with other processes where the molten matrix is cooled prior to the cutting. In a particular embodiment the surrounding air comprises chilled air.

The glass transition temperature of the volatile compound/carbohydrate mixture depends on the amount of water added to the initial mixture. In fact, it is well known in the art that the $T_g$ decreases when the proportion of water increases. In the latter embodiment of the invention, the proportion of water added to the mixture will be low, i.e. such that the glass transition temperature of the resulting mixture is substantially equal to the glass transition temperature desired for the final flavour or fragrance delivery system, i.e. the extruded product.

Now, as mentioned above, a requirement for the resulting encapsulated compound or composition is to present a glass transition temperature $T_g$ significantly above the temperature at which it will be stored and subsequently used. The critical temperature ($T_g$) must thus be at least above room temperature and preferably above 40° C. The proportions in which water is employed in the present invention therefore vary in a wide range of values which the skilled person is capable of adapting and choosing as a function of the carbohydrate glass used in the matrix and the required $T_g$ of the final product.

As cited before the extruding step of this process requires an extruding apparatus. A commercially acceptable extruding apparatus is that under the trade name designation Clextral BC 21 twin-screw extruder equipped with a cutter-knife allowing to chop the melt at the die exit, when it is still plastic. The product which is cut is thus still at a temperature which is above the glass transition temperature of the matrix.

Extruding apparatuses are not limited to the twin screw variety and may also include, for example, single screw, ram, or other similar extrusion methods.

During the extrusion process, the mixture is forced through a die having an orifice with a predetermined diameter which ranges from about 0.250 to 10 mm, more particularly from about 0.5 up to about 2.0 mm and more particularly from 0.7 to 2.0 mm. However, much larger diameters for the die are also possible.

The length of the pieces is regulated by controlling the stroke rate of the specific cutting apparatus.

The severed pieces are subsequently cooled to ambient temperature by the surrounding air. No drying or further treatment is needed. The resulting granules present a size uniformity and this size uniformity of the resulting capsules allows an improved control of flavour release.

According to this particular embodiment of the invention, where the granulation is carried out as the melt exits the die, there are thus obtained solid flavor delivery systems of substantially uniform granulometry.

In a particular embodiment, provided herein is a carrier comprising a carbohydrate or carbohydrate derivative which can be readily processed through extrusion techniques to form a dry extruded solid. Particular examples of suitable materials include those selected from the group consisting of sucrose, glucose, lactose, maltose, fructose, ribose, dextrose, isomalt, sorbitol, mannitol, xylitol, lactitol, maltitol, pentatol, arabinose, pentose, xylose, galactose, Trehalose®, hydrogenated corn syrup, maltodextrin, agar, carrageenan, gums, polydextrose and derivatives and mixtures thereof. Other suitable carrier ingredients are cited in reference texts such as H. Scherz, Hydrokolloide: Stabilisatoren, Dickungs- and Geliermittel in Lebensmittel, Band 2 der Schriftenreihe Lebensmittelchemie, Lebensmittelqualität, Behr's VerlagGmbH & Co, Hamburg, 1996. In a particular embodiment provided herein comprises a maltodextrin having a dextrose equivalent not above twenty (≤20 DE).

Particularly, the carbohydrate may comprise a non-emulsifying water soluble material such as, but not limited to, maltodextrins. In a particular embodiment, the carbohydrate is a maltodextrin with a dextrose equivalent (DE) of about 1 to about 20. In a particular embodiment, the maltodextrin is selected from a maltodextrin with a DE of about 10 up to about 18 DE. In another embodiment, the carbohydrate comprises corn syrup with a DE from 21 up to 49. Any carbohydrate can be used that is made by the hydrolysis of starches from different origins such as, but not limited to, maize, wheat, potato or rice. In another embodiment, the carbohydrate is a hydrogenated starch hydrolysate (e.g., HSPolyols), fructose oligosacharides (e.g., but not limited to Inulin from Orafit), soluble fibers such as for example but not limited to Nutriose (Roquette) and pregelatinized starch.

In another embodiment, a lubricant is provided herein. While not wishing to be bound to any theory it is believed that the lubricant reduces shear and expansion of the molten mass at the exit die. In some embodiments, the lubricant may comprise a medium chain triglyceride (MCT). In another embodiment, the lubricant comprises a micellar surfactant like lecithin or a fatty acid ester (e.g., citric, tartaric, acetic), DATEM, CITREM or mixtures of the above. In a particular embodiment, the lubricant may be provided in an amount, by weight, up to about 5%, particularly about 0.2 up to about 5%, more particularly from about 0.8% up to about 2% and even more particularly from about 1 to 2% of the total weight of the particle. In the embodiment the lubricant is provided in an amount of 2% of the total weight of the particle. In another embodiment the lubricant is provided in an amount of 1% of the total weight of the particle.

In some embodiments, there is a need to provide good flavor stability of extruded particles. It has been found that incorporating low molecular weight carbohydrates in a carrier could improve flavor stability against oxidation and evaporative loss during storage. Particular examples of suitable low molecular weight carbohydrates include those selected from the group consisting of sucrose, glucose, lactose, maltose, fructose, ribose, dextrose, isomalt, sorbitol, mannitol, xylitol, lactitol, maltitol, pentatol, arabinose, pentose, xylose, galactose, Trehalose®. It was discovered that the combination of low DE maltodextrin (for example DE of 8 or lower), and 5-10% of sugar (for example glucose monohydrate), and 10-50% Capsul® can be used to achieve retained flavor greater than 12%. Hence, provided herein in a particle comprising:

a. from about 60% up to about 80% by weight of the total amount of the particle wherein the carrier comprises:
   i. 50 to 70% by weight of a 1 to 18 DE maltodextrin of the total weight of the carrier;
   i. 30 to 50% by weight of a modified starch of the total weight of the carrier;
   ii. >5% low molecular weight carbohydrates
b. 8 to 20% by weight of water of the total weight of the particle;
c. flavor wherein the size of the particle is from about 0.5 to about 5 mm.

In a particular embodiment, the powder may be extruded at a throughput of 500 g/h through a 0.7 mm die hole using for example, but not limited to a Thermo Prism 16 mm twin-screw lab extruder or a Clextral BC21 equipped with a cutter knife in order to granulate the melt at the die exit. In another embodiment, the melt may be extruded for example as strands and allowed to cool and then cut or crushed. In a particular embodiment, the screws are configured so that they have two mixing zones. In a further embodiment the temperature profile may be 80-100-105-108° C. from the first mixing zone to the die plate. The melt temperature may range from about 80° C. and up to about 120° C. In a particular embodiment, the temperature of the mix is about 108° C.

In one embodiment, the extruder comprises 2 to 8 heating and cooling zones with temperatures ranging from 20 to about 110° C. The extruder may also comprise at least two mixing zones.

In a further embodiment, the temperature ranges at the die exit ranges from about 90 to about 130° C. and particularly at about 98° C. In a particular embodiment, the pressure is maintained below 100 bar. Particularly, the temperature at the die exit may be around 50° C. higher than the expected $T_g$.

The softening or glass transition temperature is preferably kept above 40° C. to guarantee the free flowing nature of the produced powder at ambient temperature. A small amount of water may be added to the mixture to guarantee that the carrier's glass transition temperature is above room temperature and preferably above 40° C. The glass transition temperature of the flavor or fragrance/carbohydrate mixture depends on the amount of water added to the initial mixture. The $T_g$ decreases when the proportion of water increases.

Ideally, the proportion of water added to the mixture will be low, i.e., such that the glass transition temperature of the resulting mixture is substantially equal to the glass transition temperature desired for the final flavor or fragrance delivery system, i.e., the extruded product. In one embodiment a glass transition temperature $T_g$ is provided significantly above the temperature at which the particle will be stored and subsequently used. Ideally, the temperature should be at least above room temperature and preferably above 40° C. The proportions in which water is employed may therefore vary in a wide range of values which the skilled person is capable of adapting and choosing as a function of the carbohydrate glass used in the matrix and the required $T_g$ of the final product. For instance, for a carbohydrate glass having a DE of 18, proportions from 5 to 10% of water in the mixture can be used.

In some embodiments, the size (diameter) of the particle or bead provided herein ranges in size from about 0.4 mm up to about 5 mm, particularly from about 0.5 mm up to about 2 mm, more particularly from about 0.5 mm up to about 1.4 mm, more particularly from 0.5 mm up to 1 mm and even more particularly at about 0.6, 0.7 or 1.4 mm.

Embodiments provided herein demonstrat that adequate geletinization and thus low or no birefringence of extruded particles were keys to achieve higher retained flavor oil. It was also discovered that low birefringence and higher retained flavor also can be achieved by using optimized screw configuration of the extruder. In general, the extruder barrel consists of multiple barrel sections, which are independently temperature controlled. The twin screws consist of a number of screw elements which slide onto a spline or shaft. The order and selection of screw elements is commonly referred to as the screw configuration and is an important consideration in achieving high flavor loads. The optimized screw configuration is described below and is ordered from the powder feed end, which is closest to the mechanical drive and continues to the die end, which is the product outlet.

The Feed Zone is located closest to powder feed end and includes the barrel with the powder feed port. It is composed of conveying screw elements, which are used to transfer powder into the extruder while allowing air to escape countercurrently through the powder feed port. The conveying elements may have constant or decreasing pitch. The temperatures of the barrels in this zone are typically controlled at 20° C. to 40° C. Liquids may be injected continuously into this zone.

The Melt Zone is downstream of the Feed Zone. It consists primarily of kneading blocks and conveying elements which are used to transfer mechanical energy into the product and melt the powder. Kneading blocks are selected to provide sufficient energy to melt the powder without overheating the product. The temperatures of the barrels in this zone are typically controlled at 60° C. to 110° C. Liquids are not typically injected in this zone.

The Mixing Zone is downstream of the Melt Zone. It consists of kneading blocks and mixing elements to disperse flavors and liquids into the melt, while minimizing heat generation. The temperatures of the barrels in this zone are typically controlled at 60° C. to 110° C. Liquids may be injected continuously into this zone.

The Pumping Zone is downstream of the Mixing Zone. It is adjacent to the die and consists of mixing elements and conveying elements, which are used to generate sufficient pressure to force the melt through the die. The conveying elements may be of constant or decreasing pitch. The temperatures of the barrels in this zone are typically controlled at 60° C. to 110° C. Liquids are not typically injected in this zone.

The rotation speed of the twin screws is optimized to provide sufficient mixing to disperse the flavor in the melt without overheating the product, which can cause the flavor and/or water to vaporize when the melt exits the extruder die. Specific mechanical energy is monitored and process parameters are adjusted to control the energy input.

By "flavor or flavoring composition", it is meant here a flavoring ingredient or a mixture of flavoring ingredients, solvents or adjuvants of current use for the preparation of a flavoring formulation, i.e. a particular mixture of ingredients which is intended to be added to an edible composition or chewable product to impart, improve or modify its organoleptic properties, in particular its flavor and/or taste. Flavoring ingredients are well known to a person skilled in the art and their nature does not warrant a detailed description here, which in any case would not be exhaustive, the skilled flavorist being able to select them on the basis of his general knowledge and according to the intended use or application and the organoleptic effect it is desired to achieve. Many of these flavoring ingredients are listed in reference texts such as in the book by S. Arctander, Perfume and Flavor Chemicals, 1969, Montclair, N.J., USA, or its more recent versions, or in other works of similar nature such as Fenaroli's Handbook of Flavor Ingredients, 1975, CRC Press or Synthetic Food Adjuncts, 1947, by M. B. Jacobs, van Nostrand Co., Inc. Solvents and adjuvants of current use for the preparation of a flavoring formulation are also well known in the art.

In a particular embodiment, the flavor is a mint flavor. In a more particular embodiment, the mint is selected from the group consisting of peppermint and spearmint.

In a further embodiment, the flavor is a cooling agent or mixtures thereof.

In another embodiment, the flavor is a menthol flavor.

Flavors that are derived from or based on fruits where citric acid is the predominant, naturally-occurring acid include but are not limited to, for example, citrus fruits (e.g. lemon, lime), limonene, strawberry, orange, and pineapple. In one embodiment, the flavors food is lemon, lime or orange juice extracted directly from the fruit. Further embodiments of the flavor comprise the juice or liquid extracted from oranges, lemons, grapefruits, key limes, citrons, clementines, mandarins, tangerines, and any other citrus fruit, or variation or hybrid thereof. In a particular embodiment, the flavor comprises a liquid extracted or distilled from oranges, lemons, grapefruits, key limes, citrons, clementines, mandarins, tangerines, any other citrus fruit or variation or hybrid thereof, pomegranates, kiwifruits, watermelons, apples, bananas, blueberries, melons, ginger, bell peppers, cucumbers, passion fruits, mangos, pears, tomatoes, and strawberries.

In a particular embodiment, the flavor comprises a composition that comprises limonene, in a particular embodiment, the composition is a citrus that further comprises limonene.

In another particular embodiment, the flavor comprises a flavor selected from the group comprising strawberry, orange, lime, tropical, berry mix, and pineapple.

The phrase flavor includes not only flavors that impart or modify the smell of foods but include taste imparting or modifying ingredients. The latter do not necessarily have a taste or smell themselves but are capable of modifying the taste that other ingredients provides, for instance, salt enhancing ingredients, sweetness enhancing ingredients, umami enhancing ingredients, bitterness blocking ingredients and so on.

In a further embodiment, suitable sweetening components may be included in the particles described herein. In a particular embodiment, a sweetening component is selected from the group consisting of sugar (e.g., but not limited to sucrose), a *Stevia* component (such as but not limited to stevioside or rebaudioside A), sodium cyclamate, aspartame, sucralose, sodium saccharine, and Acesulfam K or mixtures thereof.

The dry particles provided herein may be suitable for conveying flavors to beverages, fluid dairy products, condiments, baked goods, frostings, bakery fillings, candy, chewing gum and other food products.

Beverages include, without limitation, carbonated soft drinks, including cola, lemon-lime, root beer, heavy citrus ("dew type"), fruit flavored and cream sodas; powdered soft drinks, as well as liquid concentrates such as fountain syrups and cordials; coffee and coffee-based drinks, coffee substitutes and cereal-based beverages; teas, including dry mix products as well as ready-to-drink teas (herbal and tealeaf based); fruit and vegetable juices and juice flavored beverages as well as juice drinks, nectars, concentrates, punches and "ades"; sweetened and flavored waters, both carbonated and still; sport/energy/health drinks; alcoholic beverages plus alcohol-free and other low-alcohol products including beer and malt beverages, cider, and wines (still, sparkling, fortified wines and wine coolers); other beverages processed with heating (infusions, pasteurization, ultra-high temperature, ohmic heating or commercial aseptic sterilization) and hot-filled packaging; and cold-filled products made through filtration or other preservation techniques.

Fluid dairy products include, without limitation, non-frozen, partially frozen and frozen fluid dairy products such as, for example, milks, ice creams, sorbets and yogurts.

Condiments include, without limitation, ketchup, mayonnaise, salad dressing, Worcestershire sauce, fruit-flavored sauce, chocolate sauce, tomato sauce, chili sauce, and mustard.

Baked goods include, without limitation, cakes, cookies, pastries, breads, donuts and the like.

Bakery fillings include, without limitation, low or neutral pH fillings, high, medium or low solids fillings, fruit or milk based (pudding type or mousse type) fillings, hot or cold make-up fillings and nonfat to full-fat fillings.

Examples A and B

A BC-21 co-rotating twin screw extruder (Clextral, Firminy France, L/D=32) was used to encapsulate single fold, cold pressed orange oil into a solid particulate form. The powder feed consisted of maltodextrin and Capsul®. The powder was fed into the extruder by means of a loss-in-weight powder feeder with a set point of 8.0 kg/hr. A lubricant (soy lecithin/Neobee M5) was injected at a rate of 100 g/hr. Temperature set points on the extruder barrels ranged from 20-100° C. The screw speed kept constant at 500 rpm. The carbohydrate melt was extruded through a die plate with 1-mm diameter holes. After establishing steady-state extrusion condition, particles were cut by means of rotating cutting blades/knives and particles were sieved between 710 and 1,400 μm. The samples were collected for oil content and glass transition temperature analysis.

Orange oil was injected into the extruder at different flow rate to obtain different flavor load. At each flavor load, all process parameters were kept stable for at least 20 min. Maximum load injected to the extruder was identified when oil dephasing at the die was observed. Water was injected into the extruder as a plasticizer to obtain samples with glass transition temperature of ($T_g$) about 35-40° C.

Extruded particles with different carrier compositions were produced. The carrier formulations in weight % are summarized in Tables 1, 2 and 3. Oil content was determined using steam distillation. Neat oil was distilled to calculate the distillability (recovery) of orange oil. Extruded particles were distilled for 2 hours. Oil volume was recorded after the sample was cooled down to room temperature and the quantity of recovered oil was calculated from the volume and density (0.84 g/mL for orange oil).

In example A, 70% 18 DE maltodextrin and 30% Capsul® was used as the carrier. The maximum flavor load that can be injected into the extruder was 12.6% without any oil dephasing at the die and the retained oil content was 9.1% in extruded particles. In example B, 70% 10 DE maltodextrin and 30% Capsul® were used as the carrier, the maximum injected into the extruder was 12.3% corresponding to retention of 9.1%. The molecular weight of 18 DE maltodextrin, 10 DE maltodextrin, and Capsul® were determined by size exclusion chromatograph and the DE value of formula A and B were calculated as 10.2 and 7.8, respectively. The details of formulation and flavor retention of examples A and B were described in Table 1.

Tables

TABLE 1

Summary of carrier compositions of various Twin Screw Extruded samples

| Carrier composition | Polymer $M_n$* | Example A | Example B | Example C | Example D | Example E | Example F |
|---|---|---|---|---|---|---|---|
| 18 DE Maltodextrin | 1225 | 70% | | | | | 35% |
| 10 DE Maltodextrin | 1644 | | 70% | | | | |
| 6 DE Maltodextrin | 3934 | | | 70% | | 35% | |
| 1 DE Maltodextrin | 12584 | | | | 70% | 35% | 35% |
| Capsul ® | 5655 | 30% | 30% | 30% | 30% | 30% | 30% |
| Carrier $M_n$ | | 1601 | 2088 | 3934 | 12584 | 5994 | 2728 |
| Carrier DE | | 10.2 | 7.8 | 4.1 | 1.3 | 2.7 | 6.0 |
| Max. oil load (injected oil) | | 12.6% | 12.3% | 15.7% | 18.5% | 16.6% | 15.9% |

TABLE 1-continued

| Carrier composition | Polymer $M_n$* | Example A | Example B | Example C | Example D | Example E | Example F |
|---|---|---|---|---|---|---|---|
| Oil fix at max. load (retained oil) | | 9.1% | 9.1% | 12.1% | 15.3% | 13.8% | 13.0% |
| $T_g$ (° C.) | | 41 | 38 | 38 | 35 | 36 | 35 |

*$M_n$ (the number average molecular weight) was determined by size-exclusion chromatography known from the literature.

In both examples of A and B, retained flavor oil in extruded samples is less than 10% which is in line with reported values. Porzio and Zasypkin (U.S. Pat. No. 7,488, 503B1) provided examples of four carriers in melt extrusion: Hi-Cap 100: EmCap 12639: Lactose (40:30:30%), Emcap 12634: Hi-Cap 100: Lactose (40:20:40%), MiraCap: Hi-Cap 100: Dextrose (75:20:5%), and EmCap 12634: Stadex 90: Lactose (50:20:30%). In all cases, the fix of lemonade flavor or butter flavor was in the range of 5.9-9.6%. Zasypkin, Paranjpe, Reick, and Johnson (US patent application US2013/0243851 A1) provided examples of carrier composition comprising 80% 5 DE maltodextrin, 17% 18 DE maltodextrin and 3% saponin Quillaja extract and the maximum fix for 5 fold Valencia orange oil was 9.9%.

Modified starches (e.g. Capsul®, MiraCap®, and others) are present as granules with particle size in the range of 10-30 μm. These granules have semi-crystalline structure showing strong birefringence under polarized light (FIGS. 1 and 2). The extruded particles made without Capsul® did not show substantial birefringence (FIG. 3) whereas the extruded particles made with Capsul® and 18 DE maltodextrin (example A) and 10 DE maltodextrin (example B) showed strong birefringence as illustrated in FIGS. 4 and 5. The presence of strong birefringence indicated inadequate gelatinization of starch granules which negatively affected the encapsulation performance of Capsul® and thus resulted in low level of retained flavor (<10%).

Examples C and D

Carrier formulas of C and D consist of lower DE maltodextrin (6 DE or 1 DE) and Capsul®. Following the same process conditions as described in examples A and B, the maximum flavor loads that can be injected into the extruder without oil dephasing at the die were 15.7% for the carrier of 70% 6 DE maltodextrin and 30% Capsul®, and 18.5% for the carrier of 70% 1 DE maltodextrin and 30% Capsul®. The maximum orange flavor retained in extruded particles was 12.1% for the carrier of 70% 6 DE maltodextrin and 30% Capsul®, and 15.3% for the carrier of 70% 1 DE maltodextrin and 30% Capsul®. The molecular weight of 6 DE maltodextrin, 1 DE maltodextrin, and Capsul® were determined by size exclusion chromatography. The DE value of formulas C and D were calculated as 4.7 and 1.2, respectively. The details of formulation and flavor retention of examples C and D were described in Table 1. In both examples of C and D, the retained flavor was greater than 12% which is significantly higher than examples of A and B. The extruded particles made with formulas C and D did not show substantial birefringence under polarized light as illustrated in FIGS. 6 and 7. The low birefringence intensity indicated greater extent of gelatinization of starch granules and thus improved encapsulation performance. The higher content of retained flavor in examples C and D compared to examples A and B was attributed to the less (low) birefringence intensity in extruded particles of C and D than that in extruded particle of A and B.

Example E and F

Carrier formula of E comprises of 35% 6 DE maltodextrin, 35% 1 DE maltodextrin, and 30% Capsul®. Carrier formula of F comprises of 35% 18 DE maltodextrin, 35% 1 DE maltodextrin, and 30% Capsul®. The molecular weight of 18 DE maltodextrin, 6 DE maltodextrin, 1 DE maltodextrin, and Capsul® were determined by size exclusion chromatography. The DE values of formula E and F were calculated as 2.7 and 6.0, respectively. Following the same process conditions as described in examples A and B, the maximum flavor content retained in the extruded particles was 13.8% for the carrier of formula E and 13.0 for the carrier of formula F. For both examples of E and F, the retained flavor is greater than 12% which is significantly higher than the examples of A and B. The extruded particles of formula E and F did not show substantial birefringence under polarized light as illustrated in FIGS. 8 and 9.

Table 1 compared the performance of various carriers containing different DE values of maltodextrin in encapsulating orange oil. There is a correlation between the carrier DE and the maximum flavor content retained in the extruded particles as illustrated in FIG. 10. The general trend is evident that maximum flavor content retained in extruded particles decreases with increasing carrier DE value. When carrier DE is lower than 6, the flavor content is significantly increased compared to those with higher DEs (e.g. examples A and B).

Examples G

As illustrated in example A, extruded particles with a carrier containing 70% 18 DE maltodextrin and 30% Capsul® shows strong birefringence under polarized light (FIG. 4) indicating inadequate gelatinization of starch granules during extrusion process. Pregelatinized Capsul® was made by dispersing 50% Capsul® in water, heating the solution at 80° C. for 20 min, and then spray dried. Following the same process conditions as described in examples A and B, the extruded particles containing 30% pregelatinized Capsul® and 70% 18 DE maltodextrin did not show substantial birefringence as illustrated in FIG. 11 and retained higher flavor content of 11.4%. The encapsulation performance of Capsul® and pregelatinized Capsul® was compared in Table 2. It is clear that the use of pregelatinized Capsul® leads to low birefringence and thus higher retained flavor content.

TABLE 2

| Comparison of carrier compositions of examples A and G | | |
| --- | --- | --- |
| Carrier composition | Example A | Example G |
| 18 DE Maltodextrin | 70% | 70% |
| Capsul ® | 30% | |
| Pre-gelatinized Capsul ® | | 30% |
| Max. oil load (injected oil) | 11.2% | 14.1% |
| Max. oil fix (retained oil) | 9.7% | 11.4% |
| $T_g$ (° C.) | 35 | 36 |

Examples H and I

Capsul® has an average particle size of 10-15 μm which often result in poor flowability. Large particles of Capsul® can be achieved through agglomeration, compaction, compression, and etc. The larger particle size of Capsul® significantly increases the powder flow. Surprisingly, it was found that the extruded particles containing larger particles of Capsul® (compressed or agglomerated Capsul®) retained higher content of flavor compared to regular Capsul® (non-agglomerated or non-compressed Capsul®). Table 3 illustrated that larger particle Capsul® is superior to regular Capsul® in flavor retention. FIG. 12 showed the representative images of Capsul® and compressed Capsul® used in examples H and I. Following the same process conditions as described in examples A and B, the extruded particles containing compressed Capsul® (example I) showed much less birefringence than that containing regular Capsul® (example H) as illustrated in FIGS. 13 and 14. It is evident that the extruded particles with low birefringence resulted in a higher retained flavor content.

TABLE 3

| Comparison of carrier compositions of examples H and I | | |
| --- | --- | --- |
| Carrier composition | Example H | Example I |
| 18 DE Maltodextrin | 50% | 50% |
| Capsul ® | 50% | |
| Compressed Capsul ® | | 50% |
| Max. oil fix (retained oil) | 12.5% | 14.5% |
| $T_g$ (° C.) | 41 | 43 |

Examples J and K

A watermelon flavor (density of 0.87 g/mL) was encapsulated in a carrier containing 50% 6 DE maltodextrin and 50% Capsul® by a twin screw extrusion process. Two sets of screw configurations were used and compared for extrusion encapsulation of this watermelon flavor. The results are presented in Table 4. In example J, the screw configuration was not optimal. Particularly the Mixing Zone has no kneading elements or dispersive mixing elements. In example K, an optimized screw configuration following the guidelines described above was used. Kneading and mixing elements are incorporated in the Mixing Zone to provide adequate shearing and dispersive mixing. Following the same process conditions as described in examples A and B, the extruded particles in example J showed strong birefringence as can be seen in FIG. 15. The intact starch granules embedded in the extruded particles are evident indicating inadequate gelatinization and thus low retained flavor of 9.4% with a glass transition temperature of 45° C. On the contrary, the extruded particles in example K showed much less birefringence as can be seen in FIG. 16. Almost no intact starch granules can be seen in the extruded particles and the retained flavor was 12.9% with a glass transition temperature of 42° C. The significantly higher retained flavor in the extruded particles using optimal screw configuration resulted from adequate dispersive mixing and thus lower birefringence intensity compared to the extruded particles using screw configuration before optimization. Therefore, optimized screw configuration by following the methodology provided above can achieve higher retained flavor.

TABLE 4

| Carrier compositions and retained flavor of examples J and K | | |
| --- | --- | --- |
| Carrier composition | Example J screw configuration (not optimal) | Example K optimal screw configuration |
| 6 DE Maltodextrin | 50% | 50% |
| Capsul ® | 50% | 50% |
| Max. oil fix (retained oil) | 9.4% | 12.9% |
| $T_g$ (° C.) | 45 | 42 |

Examples L and M

Orange oil was encapsulated in carriers containing 6 DE maltodextrin, glucose monohydrate and Capsul® by a twin screw extrusion process using optimal screw configuration as described in previous examples. The same process conditions was applied as described in examples A and B. The carrier composition and retained flavor of examples L and M were presented in Table 5. In both examples of L and M, extruded particles had low birefringence as shown in FIGS. 17 and 18 and the retained orange oil is 12.4% and 13.7, respectively.

TABLE 5

| Carrier compositions and retained flavor of examples L and M | | |
| --- | --- | --- |
| Carrier composition | Example L | Example M |
| 6 DE Maltodextrin | 56% | 41% |
| Capsul ® | 35% | 50% |
| Glucose Monohydrate | 9% | 9% |
| Max. oil fix (retained oil) | 12.4% | 13.7% |
| $T_g$ (° C.) | 42 | 43 |

What is claimed is:

1. A particle comprising:
   a. a carrier, wherein the carrier comprises from about 60% up to about 80% by weight of the total amount of the particle, wherein the carrier consists of:
      i. 50 to 70% by weight of a 1 to 6 DE maltodextrin of the total weight of the carrier;
      ii. 30 to 50% by weight of a modified starch of the total weight of the carrier, wherein the modified starch has been agglomerated, compacted, or compressed to achieve an average modified starch particle size between 633 μm and 1000 μm; and iii. at least 5% by weight of sugar of the total weight of the carrier;

b. 8 to 20% by weight of water of the total weight of the particle; and c. greater than or equal to 12% flavor, wherein the particle does not show substantial birefringence under polarized light; wherein the size of the particle is from about 0.5 to about 5 mm.

2. The particle as recited in claim 1, wherein the particle comprises about 0.001 up to about 2% by weight of a lubricant of the total weight of the particle.

3. A method for making the particle of claim 1, the method comprising:

a. mixing a carrier, wherein the carrier comprises from about 60% up to about 80% by weight of the total amount of the particle, wherein the carrier consists of:

i. 50 to 70% by weight of a 1 to 6 DE maltodextrin of the total weight of the carrier;

ii. 30 to 50% by weight of a modified starch of the total weight of the carrier, wherein the modified starch has been agglomerated, compacted, or compressed to achieve an average modified starch particle size between 633 μm and 1000 μm; and iii. at least 5% by weight of sugar of the total weight of the carrier, with from 8 to 20% by weight of water of the total weight of the particle, wherein the water content is such that the mixture has a glass transition temperature $T_g$ above room temperature;

b. heating the mixture at a temperature sufficient to form a molten mass;

c. adding greater than or equal to 12% flavor to the mixture or to the molten mass or both to form a flavored molten mass;

d. extruding the melt through a die to form an extrudate; and e. cutting or crushing the extrudate to form an extruded particle having a retained flavor of about greater than or equal to 12% by weight based on the total weight of the particle wherein the glass transition temperature of the particle is substantially the same as the mixture.

4. The method as recited in claim 3, the method further comprising adding from about 0.001% up to about 5%, by weight, of a lubricant of the total weight to the mixture.

5. The method as recited in claim 3, wherein the sugar is selected from the group consisting of sucrose, glucose, glucose monohydrate, lactose, maltose, fructose, ribose, dextrose, isomalt, sorbitol, mannitol, xylitol, lactitol, maltitol, pentatol, arabinose, pentose, xylose, galactose, and trehalose.

6. The method as recited in claim 3, wherein the sugar is present in an amount of 5-10% by weight of the total weight of the carrier.

7. A particle consisting of:

a. a carrier, wherein the carrier comprises from about 60% up to about 80% by weight of the total amount of the particle, wherein the carrier consists of:

i. 50 to 70% by weight of a 1 to 6 DE maltodextrin of the total weight of the carrier;

ii. 30 to 50% by weight of a modified starch of the total weight of the carrier, wherein the modified starch has been agglomerated, compacted, or compressed to achieve an average modified starch particle size between 633 μm and 1000 μm; and iii. at least 5% by weight of sugar of the total weight of the carrier;

b. 8 to 20% by weight of water of the total weight of the particle;

c. greater than or equal to 12% flavor, wherein the particle does not show substantial birefringence under polarized light; wherein the size of the particle is from about 0.5 to about 5 mm; and d. optionally 0.001 to 5% of a lubricant.

8. The particle as recited in claim 7, wherein the sugar is selected from the group consisting of sucrose, glucose, glucose monohydrate, lactose, maltose, fructose, ribose, dextrose, isomalt, sorbitol, mannitol, xylitol, lactitol, maltitol, pentatol, arabinose, pentose, xylose, galactose, and trehalose.

9. The particle as recited in claim 7, wherein the sugar is present in an amount of 5-10% by weight of the total weight of the carrier.

\* \* \* \* \*